United States Patent [19]

Nishimura et al.

[11] Patent Number: 5,412,487
[45] Date of Patent: May 2, 1995

[54] VIDEO CAMERA AND APPARATUS FOR EXTRACTING AN OBJECT

[75] Inventors: Ryuji Nishimura, Yokohama; Mayuko Yamamoto, Kawasaki; Takuya Imaide, Fujisawa, all of Japan

[73] Assignee: Hitachi, Ltd., Tokyo, Japan

[21] Appl. No.: 159,132

[22] Filed: Nov. 30, 1993

Related U.S. Application Data

[63] Continuation-in-part of Ser. No. 940,348, Sep. 3, 1992, Pat. No. 5,347,391, which is a continuation-in-part of Ser. No. 798,892, Nov. 27, 1991, Pat. No. 5,293,255.

[30] Foreign Application Priority Data

Nov. 30, 1992 [JP] Japan ................................ 4-320336
Jan. 27, 1993 [JP] Japan ................................ 5-011732

[51] Int. Cl.⁶ ............................................ H04N 1/387
[52] U.S. Cl. .................................... 358/452; 348/346
[58] Field of Search ................... 348/356, 362–364, 348/345, 349, 352, 354; 358/452–453

[56] References Cited

U.S. PATENT DOCUMENTS

| | | | |
|---|---|---|---|
| 4,403,256 | 9/1983 | Green et al. ...................... | 348/208 |
| 4,535,364 | 8/1985 | Hirobe ............................... | 348/364 |
| 4,701,782 | 10/1987 | Duvent ............................. | 348/356 |
| 4,789,898 | 12/1987 | Zwirn et al. ...................... | 348/354 |
| 4,794,459 | 12/1987 | Moberg et al. .................... | 348/346 |
| 4,829,382 | 5/1989 | Hess et al. ....................... | 348/346 |
| 4,871,906 | 10/1989 | Ueda et al. ....................... | 358/227 |
| 4,965,678 | 10/1990 | Yamada ............................ | 358/452 |
| 5,063,606 | 11/1991 | Takamori ......................... | 358/453 |

FOREIGN PATENT DOCUMENTS

| | | |
|---|---|---|
| 4-3155 | of 0000 | Japan . |
| 3-19476 | of 0000 | Japan . |
| 2-214272 | of 0000 | Japan . |

*Primary Examiner*—Stephen Brinich
*Attorney, Agent, or Firm*—Antonelli, Terry, Stout & Kraus

[57] ABSTRACT

A video camera and apparatus for extracting an object from a video signal. The video camera and the extracting apparatus include units for setting a plurality of different parameters for distinguishing a plurality of areas in an input video signal according to the plurality of different set parameters, a unit for determining an extracting area in accordance with the plurality of areas distinguished by the setting units, and an extracting unit for generating extracting information for the extracting area for the video signal. The video camera includes a unit for controlling an operation of the video camera in accordance with the extracted information. Alternatively or additionally, the video camera includes a unit for indicating an area of a portion of an object viewed by a camera operator, a unit for sampling the video signal in the region of the indicated area, a unit for setting at least one parameter of the portion of the object in accordance with the sampled video signal, and an extracting unit for extracting at least the portion of the object in accordance with the set parameter. The video camera further includes a control unit for controlling an operation of the video camera in accordance with the extracted portion of the object.

32 Claims, 13 Drawing Sheets

CONTOURS INDICATING EXTRACTED REGION

FRAME INDICATING EXTRACTED REGION

VIDEO CAMERA AND APPARATUS FOR EXTRACTING AN OBJECT

CROSS-REFERENCE TO RELATED APPLICATIONS

This application is a continuation-in-part application of U.S. application Ser. No. 940,348, filed Sep. 3, 1992, now U.S. Pat. No. 5,347,391, issued Sep. 13, 1994, which is a continuation-in-part application of U.S. application Ser. No. 798,892, filed Nov. 27, 1991, now U.S. Pat. No. 5,293,255, issued Mar. 8, 1994, the subject matter of each of the aforementioned applications being incorporated by reference herein.

FIELD OF THE INVENTION

The present invention relates to a video camera and more particularly to a video camera in which control is executed to make it possible to have pictures taken as intended by the camera operator and an apparatus for extracting an object, for example, for use in a special effect apparatus, and more particularly to an apparatus for extracting object, which extracts the portion of the object from an input video signal and processes the portion of the object and the remaining background portion separately.

BACKGROUND OF THE INVENTION

Video cameras of conventional structure are provided with various functions to improve their usability such as an automatic focus (AF) function and an automatic exposure (AE) function. While basic control mechanisms of such focusing control and exposure control are automated by known arts, there still are attempts to develop high-level control of such functions. For example, as for the automatic focusing function, focusing on the object when the object is a human being has been made more reliable by detection of the portion of skin-color. As for automatic exposure control, it has become possible to achieve exposure "control suitable for each object" by performing such control as to weighting a portion of the video signal. Such controls are disclosed for example in Japanese Laid-open Patent Application No. 2-214272 and Japanese Laid-open Patent Application No. 3-19476.

However, the automatic focusing control function and the automatic exposure control function provided for conventional video cameras have not always been such as to ensure that the picture taking is always done as intended by the camera operator. For example, as to auto focus control it sometimes occurs that a body in the foreground or background, which is not aimed at by the camera operator, is brought into focus. As to the automatic exposure control, it sometimes occurs, in the case of excessive forward light or the case of back light, that a suitable exposure is not obtained for an object aimed at by the camera operator and, hence, whitening or blackening is caused.

Further, as an apparatus for extracting the portion of an object from a video signal, there has been known a chroma key apparatus as for example, disclosed in Japanese Patent laid-open Application No. 4-3155. In the chroma key apparatus, the background portion in a single color is extracted from a chrominance signal and, thereby, the portion of the object is separated from the portion of background.

However, in order that the portion of the object is extracted in the above described conventional apparatus, it is required that the background is provided in a single color. Therefore, there has been a problem that the apparatus can only be used in a limited environment such as a studio. There has also been such a problem that it becomes difficult to extract an object in stabilized conditions when changes in illuminance are produced or shadows are cast on the background.

SUMMARY OF THE INVENTION

An object of the present invention is to solve the problems encountered in the conventional arts as described above and provide a video camera capable of picture taking as intended by the camera operator.

Another object of the present invention is to provide an apparatus for extracting an object capable of simply extracting the portion of the object from a video signal in whatever image pickup environment.

A further object of the present invention is to provide an apparatus for extracting an object capable of extracting the object in stabilized conditions even when changes in illuminance are produced.

In accordance with a feature of the present invention, the video camera comprises a signal processing circuit (video signal generator circuit) for digitally processing a signal output from an imaging device, which photoelectrically converts an incident light beam admitted through a lens, including an arrangement for enabling the operator to designate an object, a sampling circuit for sampling a video signal of the portion of the object designated by the operator from the video signal output from the signal processing circuit, an extractor circuit for extracting a specific object from the video signal output from the signal processing circuit with the sampling information used as a key, and a control circuit for overall control of the camera.

With the video camera according to the present invention, the operator can selectively designate an object to be taken. More specifically, the operator's adjustment of the picture taking angle (adjustment of the orientation of the taking lens) to bring the object desired by the operator into coincidence (an overlapped state) with a marker displayed in a predetermined position on a view finder (electronic view finder), superposed on an image of an object, and the operator pressing then a button for determining the object causes the video camera to recognize that the object has been designated. The video camera, thereupon, samples the video signal of the portion of the object designated by the operator, i.e., samples the video signal of the portion of the object where the marker is located, and obtains information about color and brightness of the object. Then, the video camera extracts the object using the information as the key and recognizes the shape and the like of the object from results of the extraction. Then, the video camera recognizes, from the sampled information and the results of the recognition of the shape and the like, what the operator has designated as the object and also distinguishes the object designated by the user from the remaining region.

Accordingly, the video camera can easily determine a control method to take the object desired by the operator in the most suitable way and execute auto focus control on the designated object and automatic exposure control suited for the designated object. Thus, a video camera capable of reliably achieving the picture taking as intended by the operator can be realized.

In accordance with another feature of the present invention, the apparatus for extracting an object comprises a plurality of signal processing units applying different signal processing treatments to an input video signal, a plurality of binarization units having conditions for extraction set up therein in advance for generating binary signals having different levels according to the input video signal for the signal portion satisfying the conditions for extraction or for the remaining signal portion, a generation unit for combining the output signals from the plurality of binarization units for generating a key signal indicating the entire region of object in the input video signal, and a selection unit for selectively outputting signals output from the plurality of signal processing units in accordance with the key signal.

According to a further feature of the present invention, the apparatus for extracting an object comprises a generation unit for generating a normalized signal of the color difference signal in the input signal with the luminance signal such that the key signal is generated from this normalized signal and the luminance signal.

The plurality of binarization units, according to a feature of the present invention, extract each portion of an object in the following manner. Even if an object has complicated shape, color, and luminance, the object can be divided into portions wherein each portion has a luminance, hue, and saturation within a fixed range. Therefore, two, upper and lower, threshold values are set up in each binarization unit for the luminance signal and the color difference signal, and each binarization unit is adapted to generate a binarization signal going "H" (high level) when both the signals are within the upper and lower threshold values and going "L" (low level) when they are not within the threshold values. Thus, it is made possible to extract the video signal at each portion of the object. Since each of the output signals of the binarization units corresponds to each portion of the object, by combining the output signals, a key signal indicating the entire region of the object can be obtained.

The selection unit, in accordance with the key signal supplied thereto, outputs the video signal and, selectively, a signal obtained by applying a signal processing treatment to the input video signal or a separate external video signal.

Further, in accordance with another feature of the present invention, by binarizing the chrominance signal with the luminance signal, the chrominance signal can avert the effect produced thereon when changes are made in luminance or illuminance and, therefore, the apparatus can achieve extraction of the portion of object in stabilized conditions even if changes in luminance or illuminance are caused by movement of the object or bodies around the object.

In accordance with another feature of the present invention, the video camera with the marker has the apparatus for extracting an object utilizing a plurality of binarization units incorporated therein.

These and other objects, features, and advantages of the present invention will become more apparent from the following description when taken in conjunction with the accompanying drawings which show, for purposes of illustration only, several embodiments of the present invention.

DESCRIPTION OF THE PREFERRED EMBODIMENTS

Figure 1:
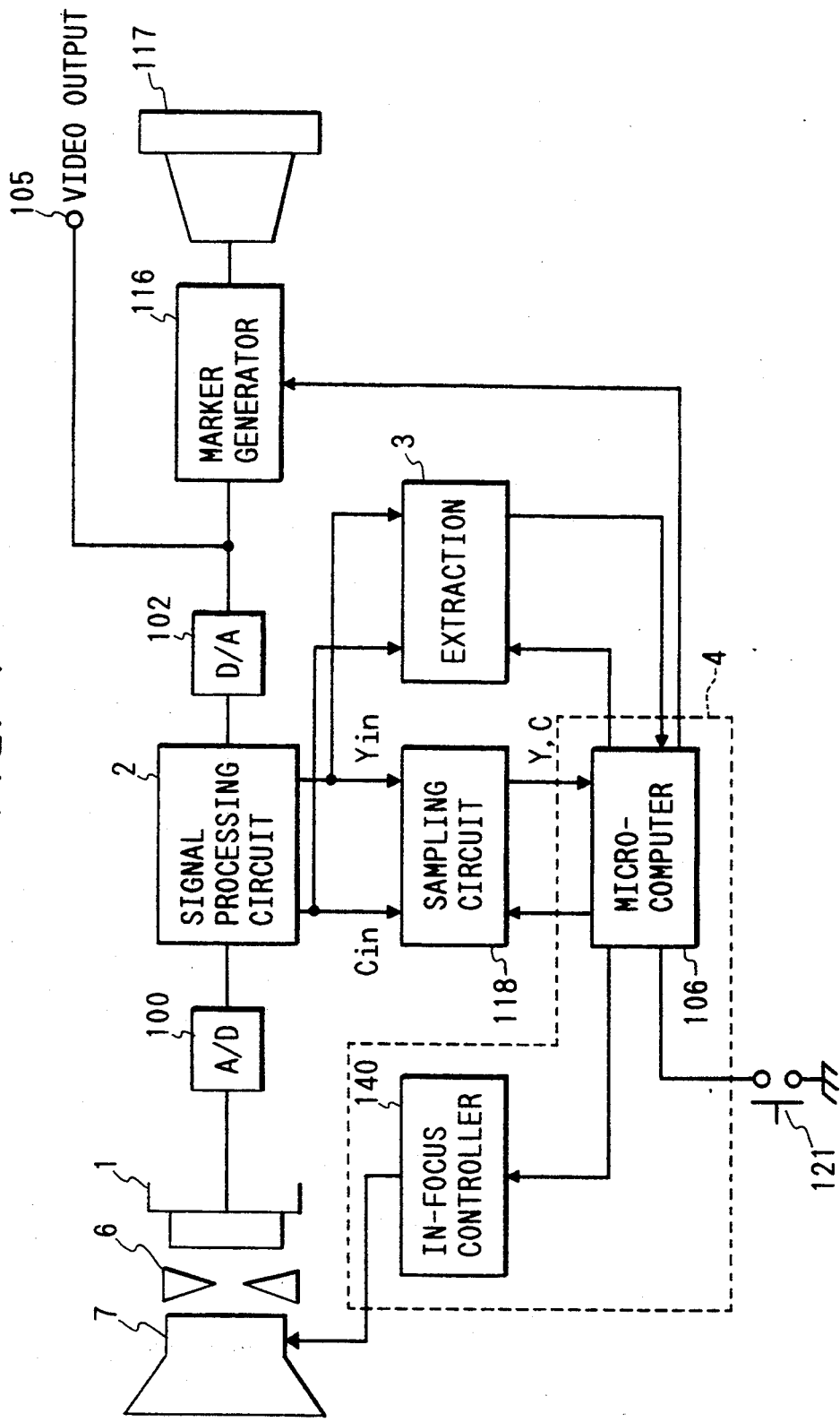
FIG. 1 is a block diagram of a main portion of a video camera according to an embodiment of the present invention.

Referring now to the drawings where like reference numerals are utilized to designate like parts throughout the several views, there is shown in FIG. 1 a block diagram of the main portion of a video camera according to an embodiment of the present invention in which an improvement in the auto focus function is achieved. As shown, the video camera includes a lens 7, an iris, shutter or step 6, and an image pickup or imaging device 1 of the CCD type, for example. The output of the imaging device is supplied to an A/D converter 100 which is connected to a signal processing circuit 2 having a D/A converter at the output thereof. There are also provided a video output 105, a marker generator circuit 116 and a view finder (electronic view finder) 117. A sampling circuit 118 is coupled to the signal processing circuit 2, an extractor circuit 3, and a control circuit 4 which includes microcomputer 106 and the like for overall control of the video camera, and an in-focus control circuit 140, the microcomputer being coupled to a switch 121.

Figure 2:
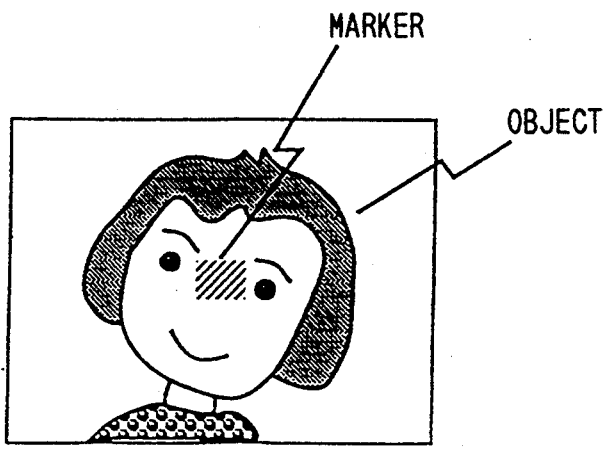
FIG. 2 shows an example of a marker displayed on the view finder of the video camera of the present invention.

In the above described arrangement, an incident light beam on the imaging device 1 admitted through the lens 7 is photoelectrically converted therein and supplied to the A/D converter 100 to be converted into a digital signal. The signal converted to the digital signal by the A/D converter is converted to a digital video signal by the signal processing circuit 2 for making known treatments such as gamma correction. The output signal of the video signal generator circuit 2 is converted by the D/A converter 102 into an analog video signal, which is provided at the video output 105 and which is input to the marker generator circuit 116. The marker generator circuit 116 superposes a marker (cursor) on the input video signal in the position specified by the control circuit 4 and outputs the video signal to the view finder 117. More specifically, a marker is displayed, for example, in the center of the display screen of the view finder 117 together with the picked up image as shown in FIG. 2. The position of the marker corresponds to the position of the video signal to be sampled by the sampling circuit 118.

Here, the camera operator, while viewing the display screen of the view finder 117, adjusts the picture taking angle (orientation of the taking lens of the video camera) so that the marker displayed, superposed on the image of the object, is in a predetermined position of the display screen of the view finder 117 and the object desired to be taken coincide with each other (overlaps) and, in this state, the camera operator presses a button of the switch 121, and thereby, the control circuit 4 recognizes that the object on which the video camera has to be then focused by the auto focus function has been designated. Thereupon, the control circuit 4 instructs the sampling circuit 118 to start the sampling of the video information of the object. The switch 121 operates as a toggle switch, i.e., when it is pressed once, the object is designated and, when it is pressed once again, the designation or the object is canceled.

Sampling circuit 118, upon receipt of the instruction to start sampling, starts the sampling of the signal of the marker position specified by the control circuit 4 from the digital video signal (luminance signal and color difference signal) output from the signal processing circuit 2 once for each field and outputs the sampled signal to the control circuit 4. The control circuit 4 via the microcomputer 106 sets up parameters or conditions for extracting an object from the object information obtained from the sampling circuit 118 and outputs the information of extracting parameters or conditions to the extractor circuit 4. Thereupon, the extractor circuit 3 extracts the designated object from the digital video signal and outputs the information as the result of extraction to the control circuit 4. The control circuit 4 via the microcomputer 106, on the basis of the information as the result of extraction, determines the shape, position, size, etc. of the designated object and outputs a control signal for bringing the designated object into focus to the in-focus control circuit 140. Then, the in-focus control circuit 140, in accordance with the control signal, based on the object data, output from the control circuit 120, controls the lens 7 so that the portion of the designated object extracted by the extractor circuit 3 is brought into focus. Thus, it is ensured that the object designated by the camera operator can be brought into focus without fail.

It is also adapted in the present embodiment such that, once the switch 121 was pressed by the camera operator and thereby a designated object is fixed, the control circuit 4 controls the sampling circuit 118 so that the sampling position traces the designated object. Accordingly, after the camera operator designates the desired object, the camera continues to extract the designated object so long as the designated object exists within the picture taking angle. Thus, a video camera which automatically traces a designated object and exercises auto focus control on the object can be realized.

Figure 4A:
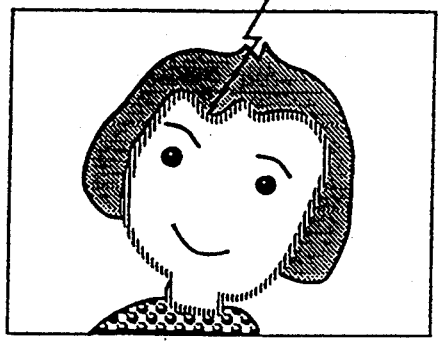
FIG. 4A shows a type of displayed results of object extraction on the view finder for a contour extracted region.
Figure 4B:
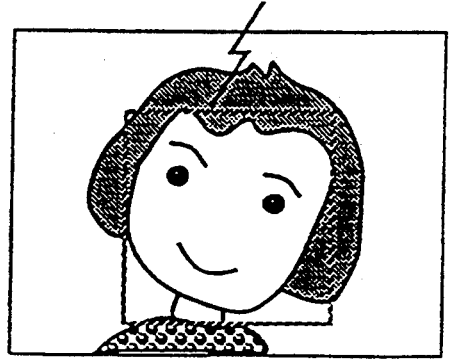
FIG. 4B shows a type of displayed results of object extraction for a frame extracted region.

In the present embodiment, to enable the camera operator to confirm that the designated object is correctly extracted (that auto focus control is executed so that the video camera is focused on the designated object), it is arranged, by using the marker generator circuit 116, such that contours of the extracted object is output superposed on the video signal on the view finder 117 as shown in FIG. 4A or a frame indicating the extracted region currently extracted is output superposed on the video signal on the view finder 117 as shown in FIG. 4B. Thus, by the display of the contours or the display of the frame, the operator can confirm that the designated object is correctly in focus. Incidentally, the signal superposed on the video signal by the marker generator circuit 116 is, of course, not output to the recording system.

Figure 3:
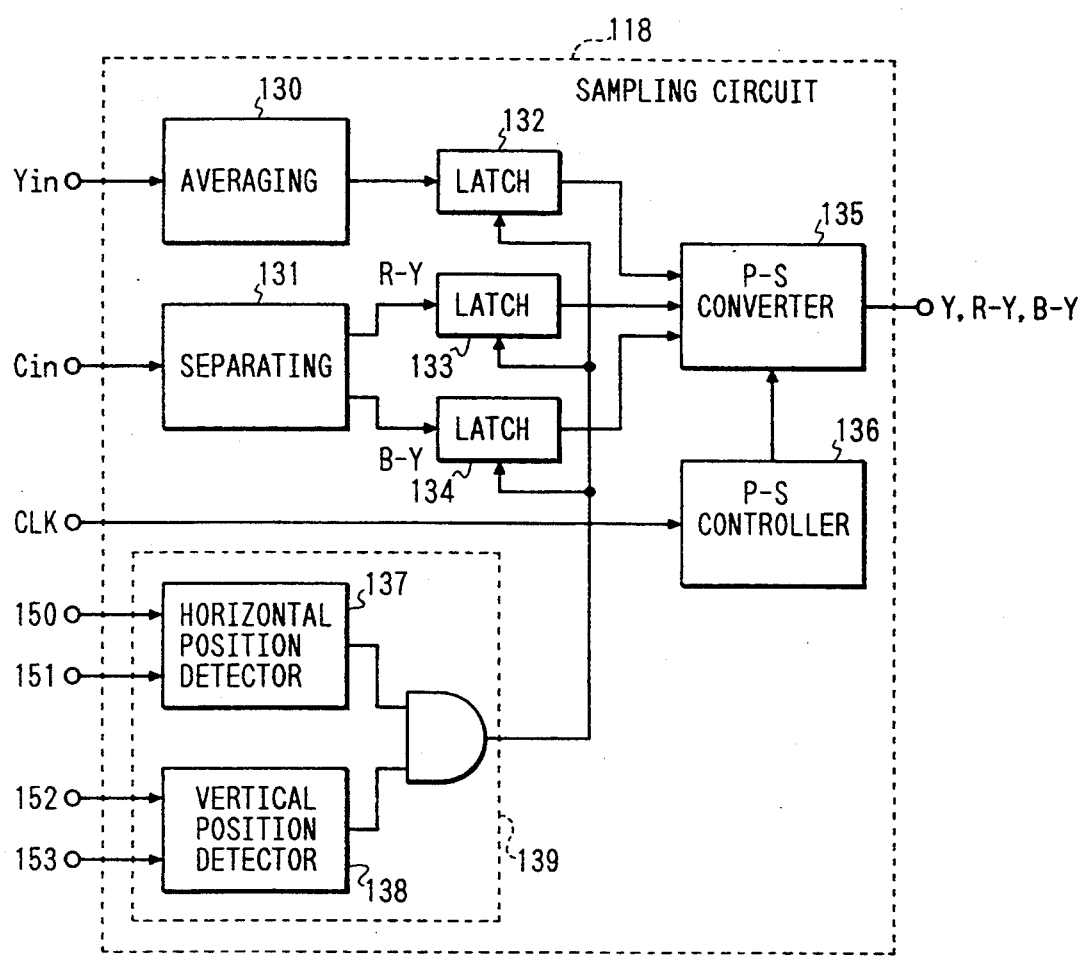
FIG. 3 is a block diagram of a sampling circuit of FIG. 1.

FIG. 3 shows a configuration of the sampling circuit 118 when digital video signals (Y, R-Y, B-Y signals) are output from the sampling circuit 118 in the proportions 4:2:2. Referring to FIG. 3, there is shown an averaging circuit 130, a separating circuit 131, latch circuits 132, 133 and 134, a parallel-to-serial (P.S.) converter circuit 135, a parallel-to-serial (P.S.) control circuit 136, a horizontal position detector circuit 137, a vertical position detector circuit 138, a position detector circuit 139 including the circuits 137 and 138, and input terminals 150–153 for the position detector circuit 139, wherein terminal 150 receives a horizontal count clock signal, terminal 151 receives a horizontal latch position signal, terminal 152 receives a vertical count clock signal, and terminal 153 receives a vertical latch position signal.

The luminance signal (Yin) supplied to the sampling circuit is input to the averaging circuit 130. In the averaging circuit 130, the average value of two horizontal pixels is obtained and this average value is output to the latch circuit 132. Meanwhile, the separating circuit 131 separates the line-sequentially input color difference signal (Cin) into the R-Y signal and the B-Y signal and outputs these color difference signals to the latch circuits 133 and 134, respectively. The position detector circuit 139 detects whether or not the successively input video signal is within the sampling range to thereby control the latch timing of the latch circuits 132, 133, and 134. The Y signal, R-Y signal, and B-Y signal latched by the latch circuits 132, 133, and 134, respectively, are input to the parallel-to-serial converter circuit 135 and sequentially output from the parallel-to-serial converter circuit 135 to the above described control circuit 4. The parallel-to-serial control circuit 136 controls data transmission timing and the like of the parallel-to-serial converter circuit 135.

Figure 5:
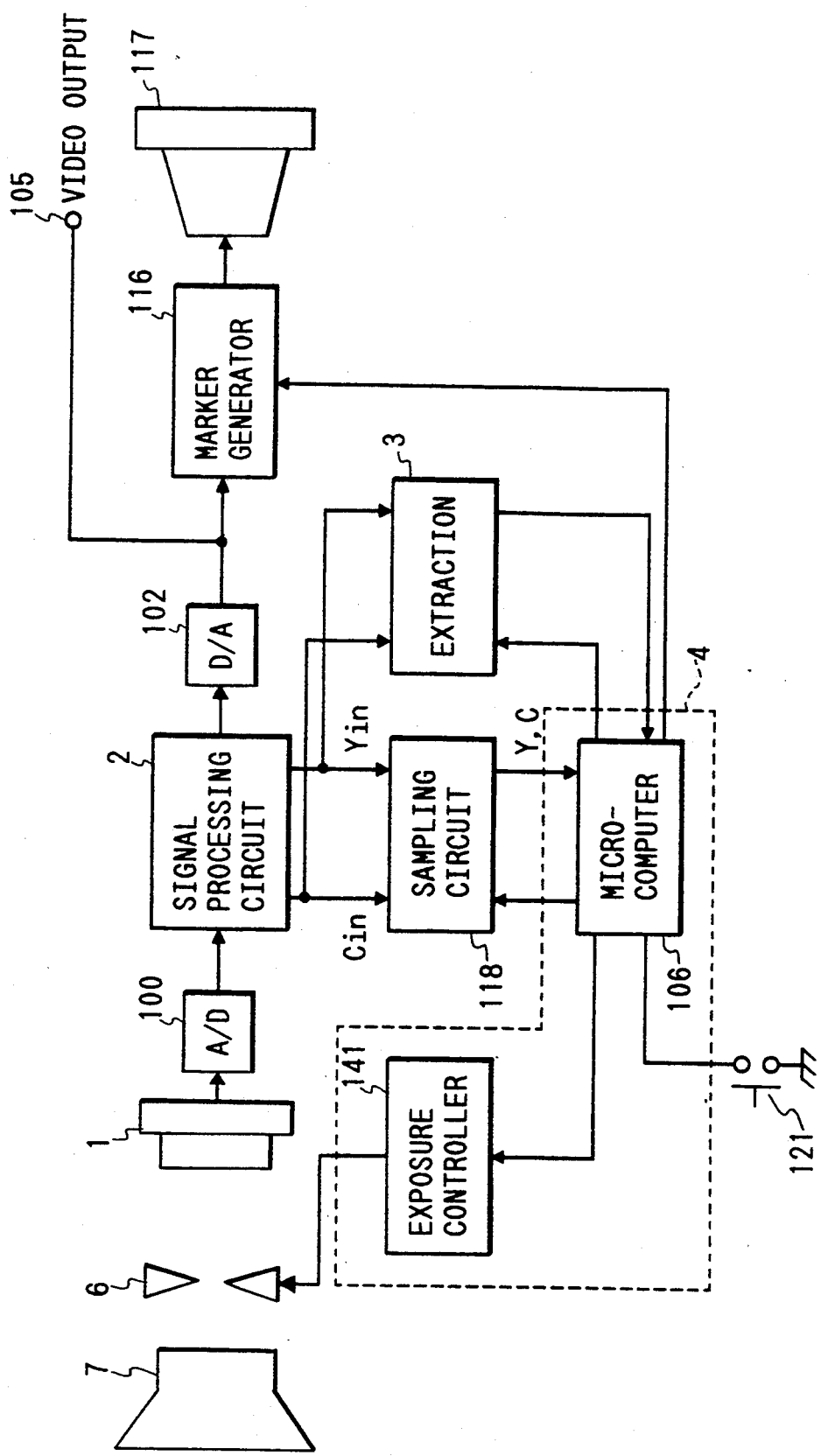
FIG. 5 is a block diagram of a main portion of a video camera according to another embodiment of the present invention.

FIG. 5 is a block diagram showing the main portion of a video camera according to another embodiment of the invention wherein an improvement in the automatic exposure function is achieved. In FIG. 5, the control circuit 4 is modified in that an exposure control circuit 141 is utilized to control the iris or stop 6. Basic operations in the embodiment of FIG. 5, such as sampling of the designated object to obtain information as to color and brightness of the object, extracting of the object using such information as the key, recognizing of the shape and the like of the object according to the results of the extraction, and recognizing what the operator designated as the object and distinguishing the object designated by the operator from the remaining region, are the same operations as described above. In the present embodiment, the control circuit 4, depending on the data of the object, outputs a control signal to optimize the brightness of the designated object to the exposure control circuit 141, and thereby the exposure control circuit 141 controls the iris or stop 6 so that the brightness of the object may be optimized. Thus, it becomes possible to achieve optimum exposure control for an object designated by the camera operator without fail.

Although examples in which the embodiments illustrated in FIGS. 1 and 5 are independently constructed have been shown above, it is apparent that the embodiments can be embodied in combination in a video camera.

By the above described arrangements for designating an object and identifying the designated object according to the present invention, the basic controlling functions such as automatic focus (AF) and automatic exposure (AE) can be improved as described. In addition, the present invention can be applied to an effector by having a specific portion and the remaining portion of the image taken processed in different ways, or it can be used in combination with an electronic zooming mechanism capable of zooming a designated object to a size filling up the screen instantly at any time.

Figure 6:
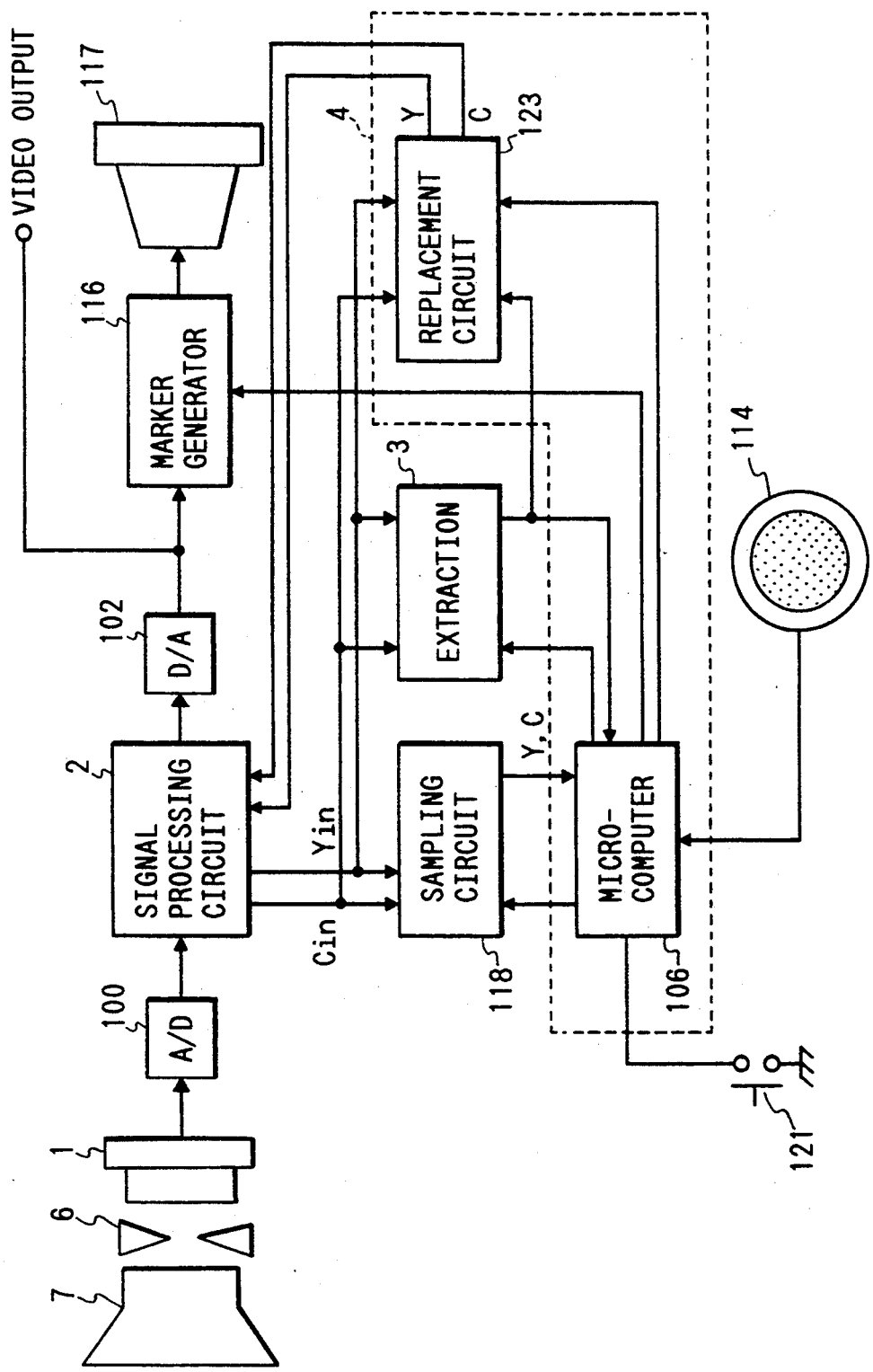
FIG. 6 is a block diagram of a main portion showing construction of a video camera according to a further embodiment of the present invention.

FIG. 6 is a block diagram showing the main portion of a video camera according to another embodiment of the invention having an effector function, i.e., a capability of replacing each of the designated portion and the remaining portion of the object with any desired color. Referring to FIG. 6, the control circuit 4 is modified to include a replacement circuit 123 and a mode setting dial or selector 114 is provided. The basic operations in this embodiment are the same as those in the above described embodiments. In this embodiment, the operator first sets up a picture-taking mode (clothes-changing, background-fading, etc.) and then presses the switch 121 with the object to be taken set in coincidence with the marker displayed on the view finder 117. Then, the designated object is extracted, as with the above embodiments. The replacement circuit 123, in accordance with the control signal from the control circuit 4 via the microcomputer 106 and the result of extraction output from the extractor circuit 3 converts the portion of the designated object and the remaining portion of the video signal to video signals with different designated characteristics and each of the converted signals is output to the signal processing circuit 2.

Figure 7A:
FIGS. 7A and 7B show examples of effector operations in accordance with the embodiment of FIG. 6.
Figure 7B:
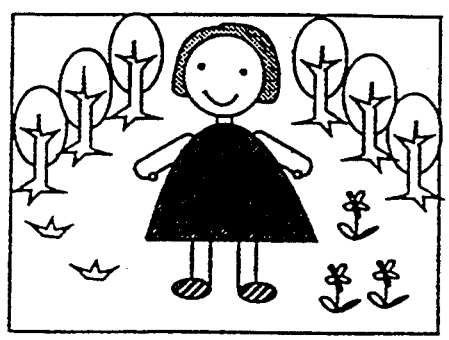

FIGS. 7A and 7B show examples of special video effects obtained in the present embodiment. In FIG. 7A, when the switch 121 is pressed with the clothes portion of the human figure set in coincidence with the marker, it is recognized that the designated object is the clothes portion, and the replacement circuit 123 converts the extracted video data of the clothes portion to another color, so that a video signal in which the clothes portion of the human figure has changed in color (clothes have been changed) as shown in FIG. 7B is output.

Figure 8:
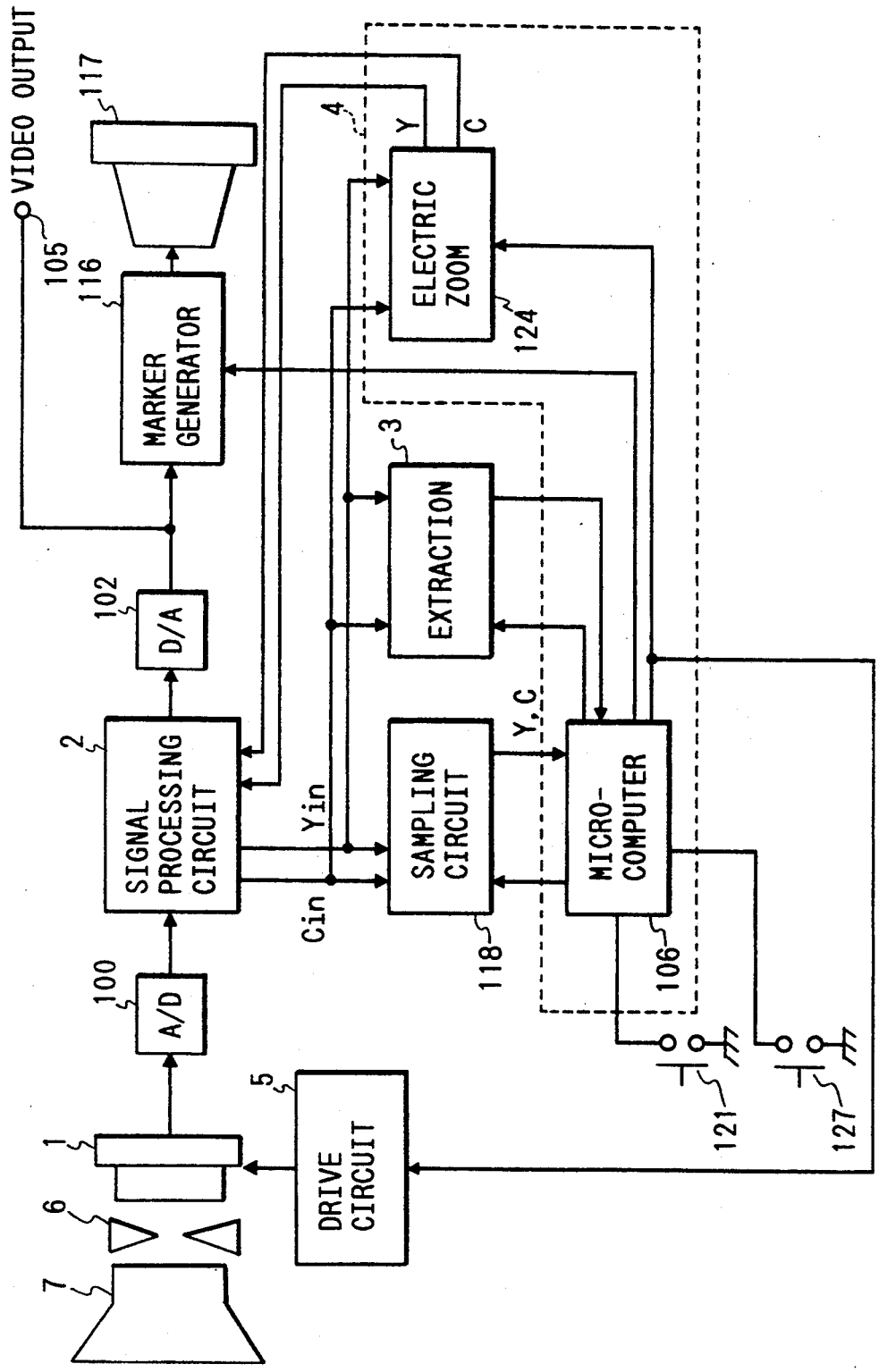
FIG. 8 is a block diagram of a main portion of a video camera according to another embodiment of the present invention.

FIG. 8 is a block diagram of the main portion of the video camera according to a further embodiment of the invention having a known zoom function capable of zooming a designated object to fill up the screen instantly at any time. Referring to FIG. 8, the control circuit 4 is modified to include an electric zoom circuit 124, a zooming switch 127, and a drive circuit 5. The basic operations in this embodiment are the same as those in the above described embodiments. Also in this embodiment, if the operator presses the switch 121 with a designated object set in coincidence with the marker displayed on the view finder 117, the designated object is extracted. Then, if the zooming switch 127 is pressed, the control circuit 4 via the microcomputer 106 calculates, from the output of the extractor circuit 3, zoom information for zooming the designated object to fill up the screen, and outputs the zoom information to the zooming circuit 124 and the drive circuit 5. Thereby, the designated object is zoomed to fill up the screen.

According to the present invention, as described above, by providing a video camera enabling the operator to designate an object desired to be taken, the video camera itself becomes able to recognize what the designated object is. Accordingly, the video camera can easily determine the control to take the picture of the object designated by the operator in the most suitable way. Thus, a high performance video camera capable of taking picture as intended by the operator can be realized.

Figure 9:
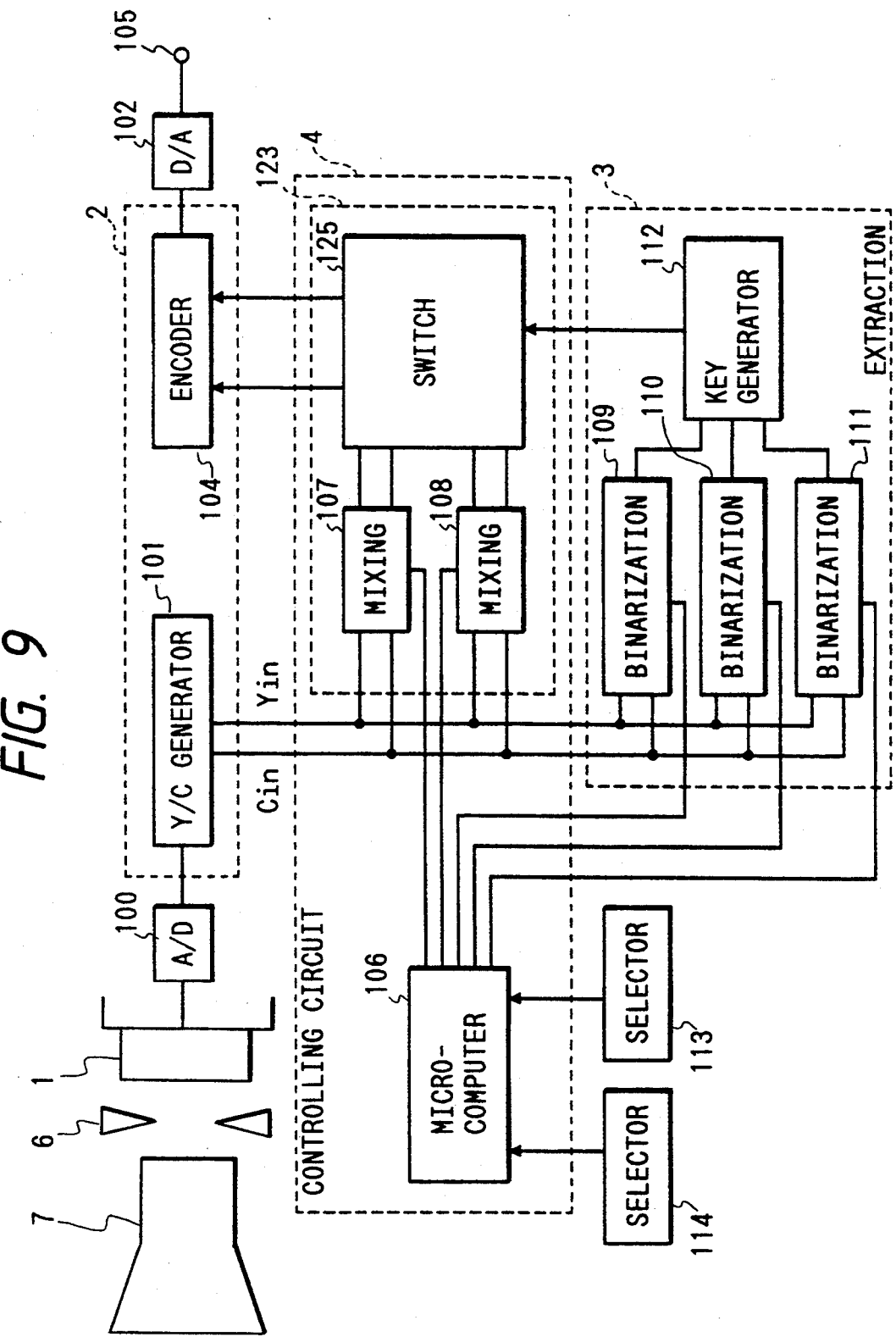
FIG. 9 is a block diagram showing an embodiment of an apparatus for extracting an object incorporated in a video camera according to the present invention.

FIG. 9 shows a block diagram of a video camera in accordance with the present invention utilizing a plurality of binarization units for extracting an object. In this embodiment, the signal processing circuit 2 includes a Y/C (luminance/color difference) signal generator circuit 101 and an encoder 104, the extractor circuit 3 includes binarization unit circuits 109, 110 and 111 and a key signal generator 112, the control circuit 4 includes the microcomputer 106 and the replacement circuit 123 having mixing circuits 107 and 108 and switch or selector circuit 125, with the microcomputer being coupled to selector units 113 and 114.

In FIG. 9, due to light rays from an object (not shown) introduced through the lens 7, an image of the object is formed at a photosensing portion of the image pickup device 1 and this image pickup device 1 photoelectrically converts the image of the object and outputs an electric signal representative of the image of the object. This electric signal is converted into a digital signal in the A/D converter circuit 100 and supplied to the Y/C signal generator circuit 4 so that a luminance signal (Yin) and a color difference signal (Cin) in a digital form are generated therein. The luminance signal Yin and color difference signal Cin are supplied to the object extractor circuit 3 and the replacement circuit 123. In the replacement circuit 123 and object extractor circuit 3, the luminance signal Yin and the color difference signal Cin are supplied to each of the mixing circuits 107 and 108 and the binarization circuits 109–111. In each of the binarization circuits 109–111, a signal portion of the video signal simultaneously included in a range of luminance, a range of hue, and a range of saturation specified by the microcomputer 106 is regarded as a portion of the object and a binary signal which goes "H" at the respective portion of the object is output therefrom. The binarization circuits have different conditions for extraction set up by the microcomputer 106 and each of the binarization circuits outputs a binary signal which goes "H" at the respective portion of the object. The binary signals from the binarization circuits 109-111 are combined in the key signal generator circuit 112 and, thereby, a binary key signal which goes "H" at the combined portion considered to be the combined portion of the object by the binarization circuits 109-111 is generated.

The mixing circuits 107 and 108 each apply predetermined signal processing treatments to the luminance signal Yin and the color difference signal Cin. The signal processing treatments include, for example, changing the level of the luminance signal Yin and changing hue or saturation. Outputs of the mixing circuits 107 and 108 are supplied to the switching circuit 125 in the form of a selector and one of the outputs of the mixing circuits 107 and 108 is selected by the switching circuit in accordance with the level of the key signal output from the key signal generator circuit 112. The luminance signal and the color difference signal output from the switching circuit 125 are signals undergoing different mixing treatments in the mixing circuits 107 and 108 according to which signal portion is considered to be the portion of the object, which is selected during the "H" period of the key signal, or which is considered to be the remaining background portion.

The output signals of the switching circuit 125 constitute the output signals of the replacement circuit 123, which are supplied to the encoder 104 to be encoded to a video signal in accordance with specifications of NTSC, or the like. The video signal is then converted to an analog signal in the D/A converter circuit 102 and output from the output terminal 105.

Figure 10:
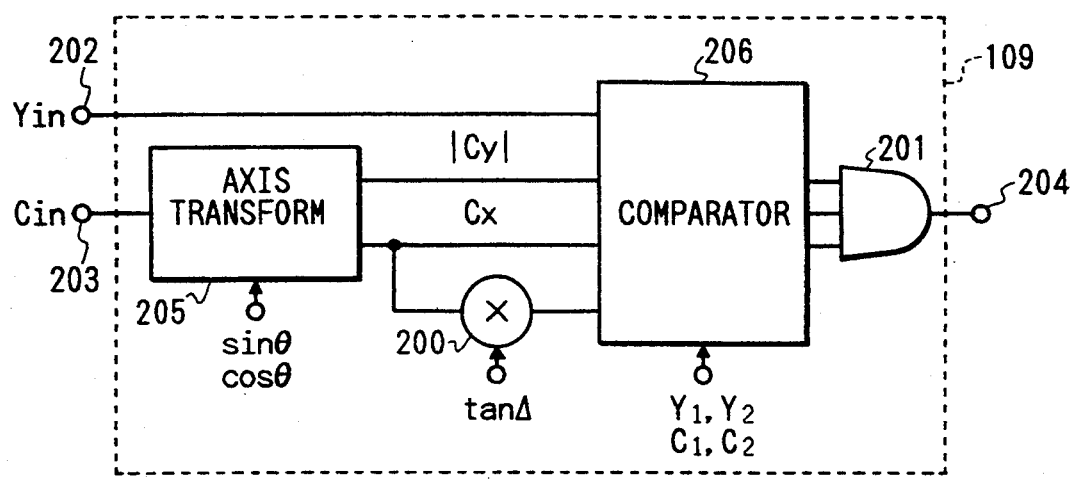
FIG. 10 is a block diagram showing a particular example of a binarization circuit of FIG. 9.

FIG. 10 is a block diagram showing a particular example of one of the binarization circuits 109-111 in FIG. 9. In FIG. 10 reference numeral 205 denotes an axis transform circuit, 206 denotes a comparator circuit, 200 denotes a multiplier circuit, 201 denotes an AND gate, and 202 and 203 denote input terminals. Referring to FIG. 10, a luminance signal Yin is input from the input terminal 202 and a color difference signal Cin is input from the input terminal 203. The color difference signal Cin is a sequential signal of two color difference signals R-Y (hereinafter called Cr) and B-Y (hereinafter called Cb). In this binarization circuit, a signal portion having a predetermined range of hue, saturation, and luminance is extracted and a binary signal indicative of such a signal portion is generated. Parameters or conditions for determining the range of extraction are set up by the microcomputer 106 (FIG. 9) in the axis transform circuit 205, comparator circuit 206, and multiplier circuit 200. The parameters set up in the axis transform circuit 205 are sinΘ and cosΘ, where Θ is the central angle of the extracted range of hue. The parameters set up in the comparator circuit 206 are those determining the ranges of luminance and saturation to be extracted, i.e., the lower limit value Y1 and upper limit value Y2 of the range of luminance and the lower limit value C1 and upper limit value C2 of the range of saturation. The parameter set up in the multiplier circuit 200 is tan A indicative of the range of hue to be extracted.

Figure 11:
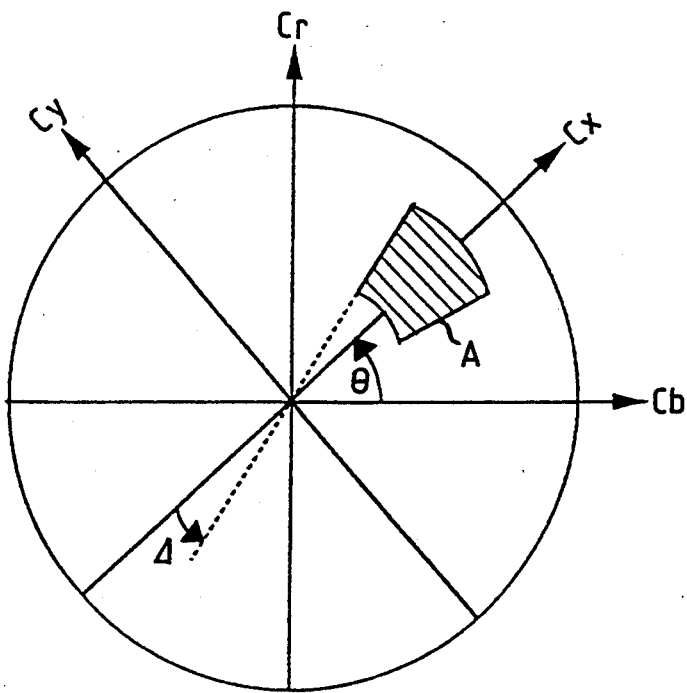
FIG. 11 is a chromaticity diagram showing a range for color extraction by the binarization circuit of FIG. 10.

The above parameters will be described with reference to FIG. 11, which shows the range of extraction by the binarization circuit on a color difference plane corresponding to a vector scope display. In FIG. 11, the abscissa represents the signal Cb and the ordinate represents the signal Cr, and, further, the distance from the center represents the saturation and the angle represents the hue. In such color difference plane, the hatched portion represents the above described extracted region A. While the above color difference plane constitutes a Cb/Cr coordinate system, the axis transform circuit 205 is for transforming such Cb/Cr coordinate system into a Cx/Cy coordinate system. While the Cx/Cy coordinate system has its point of intersection of the rectangular coordinate axes Cx and Cy, i.e., the origin, being coincident with the point of intersection in the Cb/Cr coordinate system, one of the coordinate axes Cx and Cy (the coordinate axis Cx in the present case) passes the center of the extracted region. Here, the angle between the coordinate axis Cx and the coordinate axis Cb corresponds to the aforesaid angle Θ. Accordingly, the axis transform circuit 205 is a circuit to rotate the Cb/Cr coordinate system by the angle Θ around the origin. The relationship between the Cb/Cr coordinate system and the Cx/Cy coordinate system is expressed as $$Cx = Cr \cdot \sin\Theta + Cb \cdot \cos\Theta \quad (1)$$

$$Cy = Cr \cdot \cos\Theta - Cb \cdot \sin\Theta \quad (2)$$

In FIG. 10, the axis transform circuit 205 performs a calculation according to the above expressions (1) and (2) and outputs Cx and absolute value |Cy| of Cy. The multiplier circuit 200 multiplies the output Cx from the axis transform circuit 205 by $\tan\Delta$ to output $Cx \cdot \tan\Delta$. The parameter $\tan\Delta$ is set up in the multiplier circuit 200 by the microcomputer 106 (FIG. 9) and the value $Cx \cdot \tan\Delta$ determines the range of the extracted region A in the direction of the coordinate axis Cy. In the comparator circuit 206, the parameters Y1 and Y2 determine the range of luminance of the extracted region A in the input video signal and the range of the extracted region A shown in FIG. 11 in the direction of the coordinate axis Cx, i.e., the parameters C1 and C2 determine the range of saturation, are set up by the microcomputer 106. The parameter which determines the range of the extracted region in the direction of the coordinate axis Cy, i.e., the range of hue, is $Cx \cdot \tan\Delta$ which is obtained in the multiplier circuit 200. The comparator circuit 206 performs comparison as follows on the basis of the above described parameters:

$$Y1 < Yin < Y2 \quad (3)$$

$$C1 < Cx < C2 \quad (4)$$

$$|Cy| < Cx \cdot \tan\Delta \quad (5)$$

The expression (3) indicates the signal portion of the luminance signal Yin included in the range of luminance of the above described extracted region A. In such a signal portion, the comparator circuit 206 outputs a judgment signal a1 at "H". The expression (4) indicates the signal portion of the color difference signal Cin included in the range of saturation of the extracted region A, and in such a signal portion, the comparator circuit 19 outputs a judgment signal a2 at "H". The expression (5) indicates the signal portion of the color difference signal Cin included in the range of hue of the extracted region A, and in such a signal portion, the comparator circuit 19 outputs a judgment signal a3 at "H". These judgment signals a1, a2, and a3 are supplied to the AND gate 21, and only when these signals are all at "H" a binary signal a at "H" is obtained Thus, a binary signal indicating the signal portion of the video signal, at which the hue and saturation are included in the extracted region A shown in FIG. 11, and the luminance signal Yin is in the range satisfying the above expression (3), is generated in the binarization circuit.

In FIG. 9, there are provided three of such binarization circuits as illustrated in FIG. 10, i.e., binarization circuits 109, 110, and 111, and, having the extracted region of the object desired to be extracted as shown in FIG. 11 divided into three regions with virtually the same area. Such divisions of region are assigned to the binarization circuits 109, 110, and 111, so that they can extract their respective signal portions. The ranges of luminance among the divisions of region may be the same or may be different.

Binary signals output from the binarization circuits 109, 110, and 111 are supplied to the key signal generator circuit 112. The key signal generator circuit 112 is usually formed with an OR circuit and, hence, a key signal which goes "H" is generated if any of the binary signals output from the binarization circuits 109, 110, and 111 is at "H". This key signal, when it is at "H", indicates a signal portion satisfying the conditions for extracting an object which is desired to be extracted. However, there is sometimes a case where a region satisfying the conditions for extracting an object is also present in the background. In such case, it may become necessary to eliminate the portion other than the object from the output signals of the binarization circuits 109, 110, and 111. To do this, a process according to a successive growth method or the like may be performed before or after the OR operation on the output signals of the binarization circuits 109, 110, and 111 is made in the key signal generator circuit 112. As to the successive growth method, there is description, for example, in Japanese Patent Application Publication No. 2-325643. Although there are provided three binarization circuits 109, 110, and 111 in FIG. 9, any other number of the circuits may of course be provided.

Figure 12:
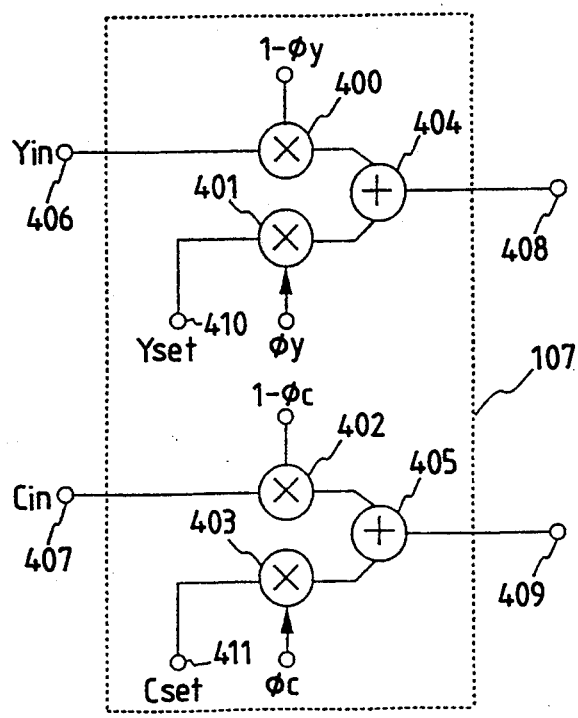
FIG. 12 is a block diagram showing a specific signal processing circuit of FIG. 9.

FIG. 12 is a block diagram showing a particular example of either of the mixing circuits 107 and 108 of FIG. 9. In the figure, reference numerals 400 to 403 denote multiplier circuits, 404 and 405 denote adder circuits, 406 and 407 denote input terminals, 408 and 409 denote output terminals, and 410 and 411 denote input terminals for Yset and Cset, respectively. Referring to FIG. 12, a luminance signal Yin is input through the input terminal 406 and a replacement signal Yset is input from the microcomputer 106 through the input terminal 410. The luminance signal Yin is multiplied by a coefficient $(1-\phi y)$ in the multiplier circuit 400 and the replacement signal Yset is multiplied by a coefficient $\phi y$ in the multiplier circuit 401 and outputs of both the multiplier circuits 400 and 401 are added in the adder circuit 404. Accordingly, a luminance signal having the luminance signal Yin and the replacement signal Yset combined in a proportion determined by the coefficient $\phi y$, $(1-\phi y)\cdot Yin+\phi y\cdot Yset$, is obtained at the output terminal 408. Thus, the input luminance signal Yin can be replaced with a luminance signal at any luminance level set up by the microcomputer 106. Further, a color difference signal Cin is input through the input terminal 407 and a replacement signal Cset is input from the microcomputer 106 through the input terminal 411. The color difference signal Cin is multiplied by a coefficient $(1-\phi c)$ in the multiplier circuit 402 and the replacement signal Cset is multiplied by a coefficient $\phi c$ in the multiplier circuit 403 and outputs of both the multiplier circuits 402 and 403 are added in the adder circuit 405. Accordingly, a color difference signal having the color difference signal Cin and the replacement signal Cset combined in a proportion determined by the coefficient $\phi c$, $(1-\phi c)\cdot Cin+\phi c\cdot Cset$, is obtained at the output terminal 409. Thus, the input color difference signal Cin can be replaced with a color difference signal with any hue and saturation set up by the microcomputer 106.

In the manner as described above, in each of the mixing circuits 107 and 108 in FIG. 9, a color difference signal Cin is converted to a color difference signal having any specified hue and saturation and a luminance signal Yin is converted to a luminance signal at any specified luminance level.

Figure 13A:
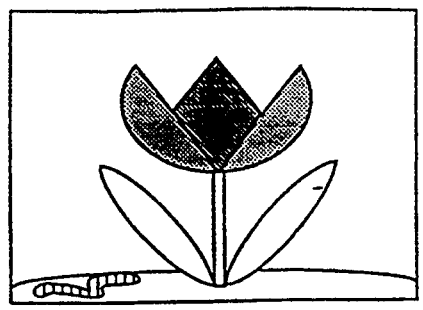
FIGS. 13A and 13B show respective examples of an input picture to and an output picture from an object extracting circuit of FIG. 9.
Figure 13B:
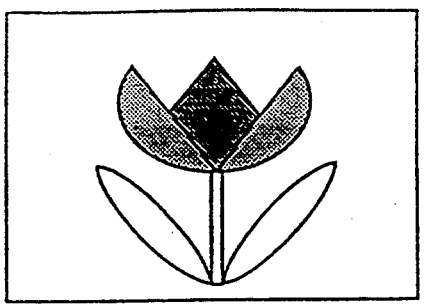

Operations in the above described replacement circuit 123 and object extractor circuit 3 will be described below taking, as a particular example, the case where the picture as shown in FIG. 13A is input. FIG. 13A shows a picture represented by an input video signal to the replacement circuit and object extractor circuit and FIG. 13B shows a picture represented by its output video signal.

Figure 14:
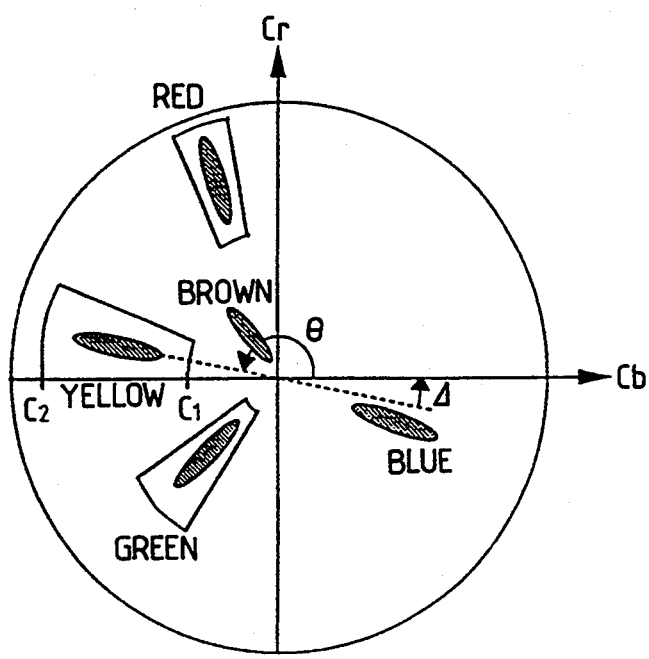
FIG. 14 is a chromaticity diagram showing chromaticity distribution of the portion of the object in the picture of FIG. 13A.

In the picture shown in FIG. 13A (hereinafter called "picture (A)"), it is assumed that the flower is desired to be extracted as the object and the remaining portion is desired to be eliminated and replaced by the sky shown in blue color as the background. Further, it is assumed that the flower is formed of a part of leaves and a part of petals, and, further, the part of petals is formed of a portion in red color and a portion in yellow color. The microcomputer 106 sets up binarization conditions for each of the binarization circuits so that the binarization circuit 109 in FIG. 9 extracts the portion of the petal in yellow, the binarization circuit 110 extracts the portion of the petal in red, and the binarization circuit 111 extracts the portion of the leaves in green, and then binarize their respective signals. It is assumed now that the color difference signal of the picture (A) is distributed on a color difference plane as shown in FIG. 14. Then, for example, parameters C1, C2 and Δ, Θ indicating the portion corresponding to the yellow color in FIG. 14 are set up as the conditions for extraction for the binarization circuit 109. Similarly, parameters are set up for the binarization circuits 110 and 111 so that they can extract the red petal portion and the green leaf portion, respectively. The key signal obtained in the key signal generator circuit 112 by combining the binary signals from the binarization circuits 109 to 111, for which the above conditions for extraction are set up, becomes a binary signal going "H" only at the portion of the flower and "L" at the remaining background portion. Meanwhile, if it is assumed that the mixing circuit 107 processes the portion of object in the input video signal and the mixing circuit 108 processes the portion of background in the input video signal, and if the portion of the flower as the object is to be displayed as it is and the remaining portion as the background is to be displayed in single blue color, the signal processing circuit 107 outputs the input video signal as it is and the mixing circuit 108 processes the input video signal into a video signal representing a single blue color. To achieve this, the coefficients $\phi y$ and $\phi c$ in the mixing circuit 107 in FIG. 4 are both set to 0, while in the mixing circuit 108 in FIG. 12, a luminance signal at a suitable constant level as a replacement signal Yset is input from the input terminal 410 and a color difference signal representing blue color as a replacement signal Cset is input from the input terminal 411 and the coefficients $\phi y$ and $\phi c$ are both set to 1.

The switching circuit 125 in FIG. 9 selects the output video signal of the mixing circuit 107 when the key signal is at "H" i e at the portion of the flower, and selects the output video signal of the mixing circuit 108 at the portion other than that of the flower, i.e., of the background. Thereby, a picture of a flower drawn on a blue background with a constant luminance can be obtained.

According to the present embodiment, as described above, the portion of object and the portion of background can be simply separated without the need for preparing a screen to become the background and the signal processing for the portion of background and the portion of object can be performed.

Figure 15:
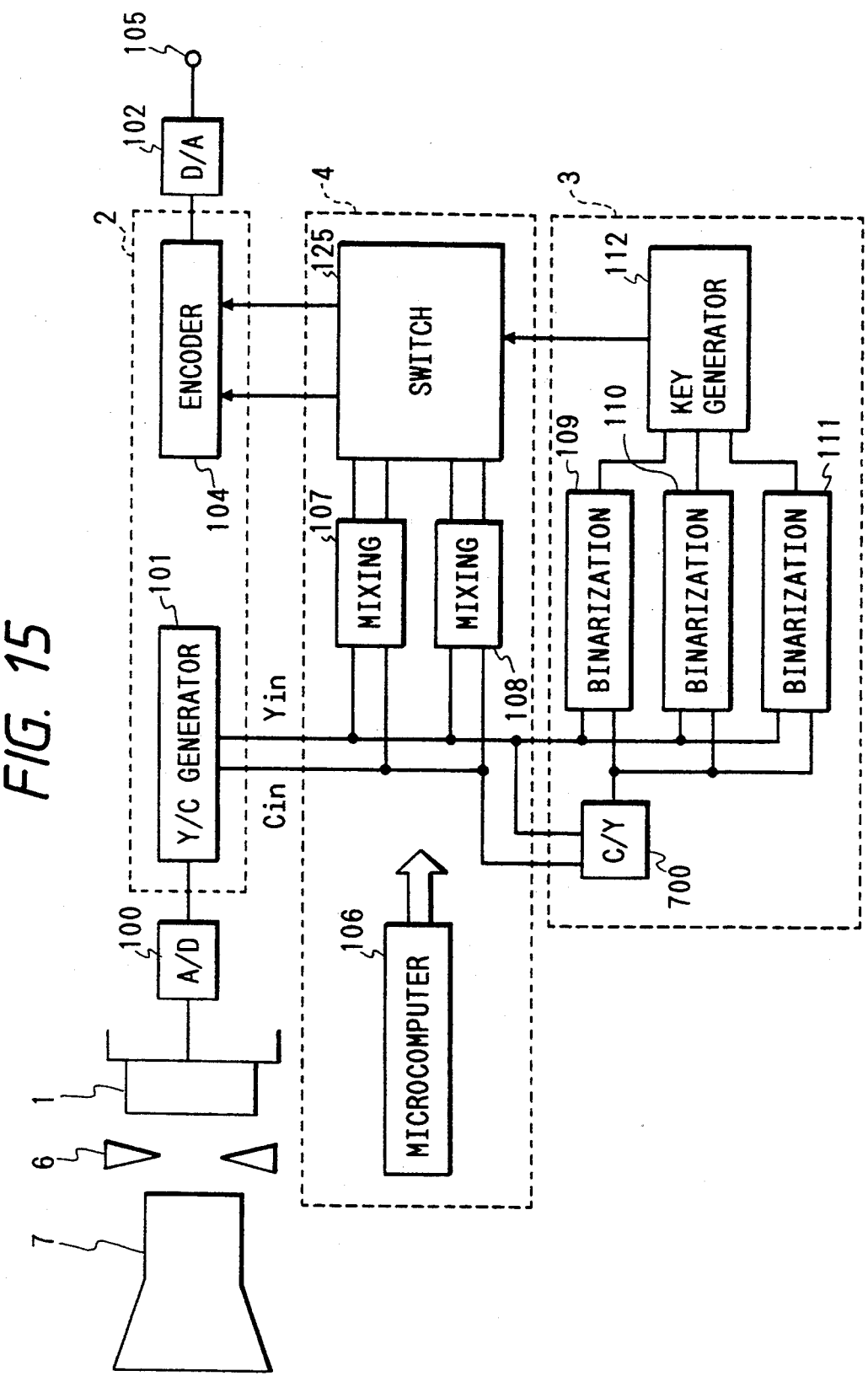
FIG. 15 is a block diagram showing another embodiment of the apparatus for extracting an object according to the present invention.

FIG. 15 is a block diagram showing another embodiment of the apparatus for extracting an object according to the present invention, in which reference numeral 700 denotes a C/Y signal generator circuit. In the present embodiment, the color difference signal Cin is normalized by having the color difference signal Cin divided by the luminance signal Yin in the C/Y signal generator circuit 700 and the output signal of the C/Y signal generator circuit is supplied, instead of the color difference signal Cin, to the binarization circuits 109 to 111. Therefore, while the extraction of object in the embodiment shown in FIG. 9 was performed on the color difference plane shown in FIG. 11, the extraction of object in the present embodiment is performed on a color difference plane normalized by the luminance. By this arrangement, it becomes possible, as described below, to achieve the extraction of the portion of object in stabilized conditions even if there are produced changes in illuminance.

Color difference signals Cr and Cb are approximately expressed as $$Cr = 0.7R - 0.6G - 0.1B \quad (6)$$

$$Cb = -0.3R - 0.6G + 0.9B \quad (7)$$

where R, G, and B are primary color signals for red, green, and blue, respectively.

When a white color beam whose R, G, and B components are all 1 is thrown on an object whose R, G, and B components of reflectivity are represented by Rr, Gr, and Br, respectively, reflected light beams from the object become Rr·1, Gr·1, and Br·1. Then, the color difference signals Cr and Cb output from the video camera become $$Cr = (0.7Rr - 0.6Gr - 0.1Br) \cdot 1 \quad (8)$$

$$Cb = (-0.3Rr - 0.6Gr + 0.9Br) \cdot 1 \quad (9)$$

At this time, if a change in illuminance occurs, Cr and Cb change proportionally to 1. Since the ratio between the color difference signal Cr an Cb, Cr/Cb, is constant, there is no change in hue, but saturation changes proportionally to 1. Consequently, when there is produced a change in illuminance, it sometimes becomes impossible to achieve stabilized extraction of an object.

Accordingly, in the present embodiment, the color difference signals Cr and Cb are normalized by being divided by the luminance signal Y. Since the luminance signal Y is expressed as $$Y = (0.3Rr + 0.6Gr + 0.1Br) \cdot 1 \quad (10)$$

the normalized color difference signals become $$Cr/Y = (0.7Rr - 0.6Gr - 0.1Br) / (0.3Rr + 0.6Gr + 0.1Br) \quad (11)$$

$$Cb/Y = (-0.3Rr - 0.6Gr + 0.9Br) / (0.3Rr + 0.6Gr + 0.1Br) \quad (12)$$

namely, the component of 1 is not included. Thus, the normalized color difference signals are not changed even if a change in illuminance is produced.

Since, in the present embodiment, the extraction of color is performed on a color difference plane normalized by the luminance signal as described above, it becomes possible to achieve the extraction of object in stabilized conditions even if there are produced changes in illuminance or luminance.

Figure 16:
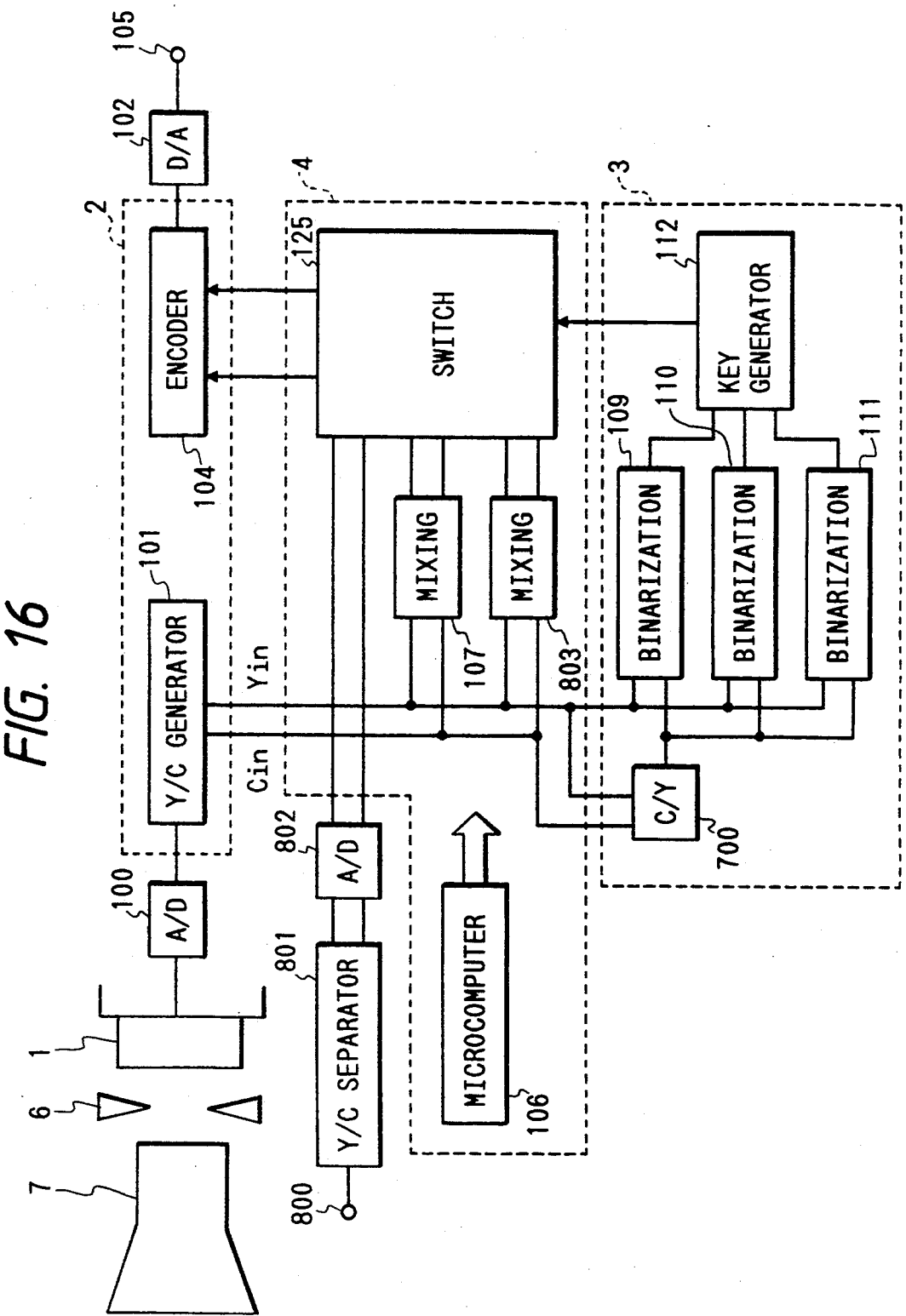
FIG. 16 is a block diagram showing still another embodiment of the apparatus for extracting an object according to the present invention.

FIG. 16 is a block diagram showing still another embodiment of the apparatus for extracting object according to the present invention, in which reference numeral 800 denotes an external input terminal, 801 denotes a Y/C separator circuit, and 802 denotes an A/D converter circuit. In the present embodiment, an external video signal input from the external input terminal 800 is supplied to the switching circuit 125 via the Y/C separator circuit and the A/D converter circuit, and it is adapted such that the background portion other than the portion of object extracted in the same manner as described in the embodiment of FIG. 9 can be replaced with the external video signal by the switching circuit 125.

Further, instead of the mixing circuit 108 in FIG. 15, there is provided a mixing circuit with a memory 803 and, thereby, it is made possible to record in the memory of the mixing circuit 803 one desired picture picked out from the video signal from the Y/C signal generator circuit 101 and use this picture as the background. In doing this, for example, a picture desired to be used as the background may be picked up by the image pickup device 1 and stored in the memory of the mixing circuit 803 in advance, and when the image of a desired object is picked up by the image pickup device 1, the picture stored in the memory of the mixing circuit 803 may be used as the background.

Figure 17:
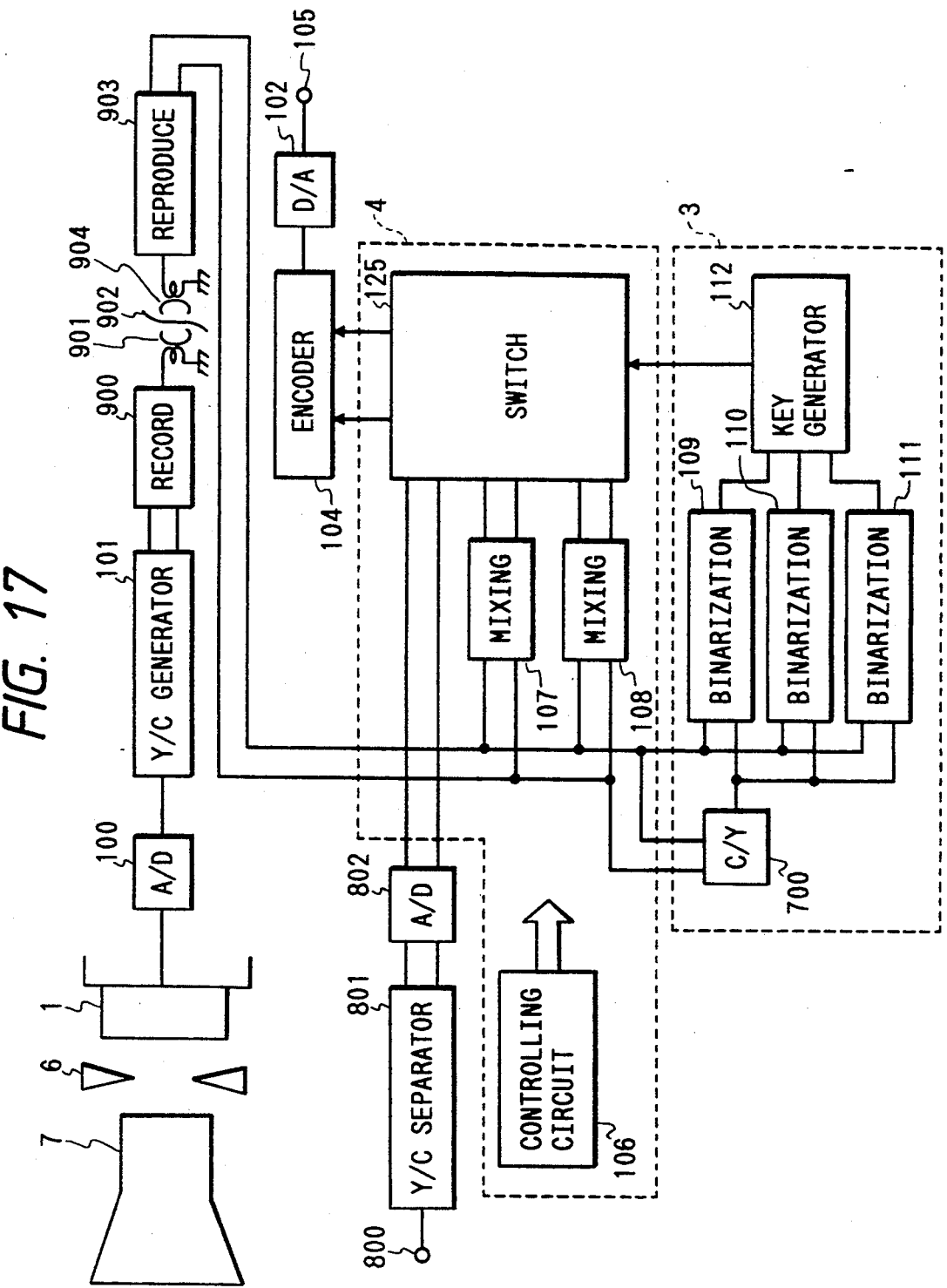
FIG. 17 is a block diagram showing a further embodiment of the apparatus for extracting an object according to the present invention.

FIG. 17 is a block diagram showing a further embodiment of the apparatus for extracting object according to the present invention, in which reference numeral 901 denotes a recording circuit, 901 denotes a record head, 904 denotes a reproduce head, 902 denotes a record medium, and 903 denotes a reproducing circuit. The present embodiment is adapted such that a video signal obtained by the image pickup device 1 is recorded and reproduced in the record medium 902 such as a video tape and it is capable of extracting an object from the reproduced signal. A luminance signal and a color difference signal generated in the Y/C signal generator circuit 101, to which the output signal of the image pickup device 1 is supplied, is converted in the recording circuit 900 to a signal in the format corresponding to the recording system and then recorded in the record medium 902 by the record head 901. The recording at this time may be digital recording or may be analog recording. The luminance signal and color difference signal reproduced from the record medium by the reproduce head 904 are processed in the reproducing circuit 903 and then supplied to the replacement circuit and extractor circuit and, therein, undergo similar processing treatments to those applied in the previous embodiments. In this embodiment, since the extraction of an object can be achieved using a signal once recorded, a meritorious effect is obtained that such operations as to replace one background with another or to apply different processing treatments to the background and the object separately can be performed during the reproduction or editing of the once recorded medium.

In the above described embodiments, the case where the signal processing circuit replaces an input signal with a signal at a desired signal level has been described. However, the signal processing circuit may be adapted to do such signal processing as to intensify the contour, to blur an image, and to scale up or down an image. By increasing the signal processing circuits and binarization circuits as well as the key signal generator circuit in number, more complex processing can be achieved. According to the present invention, as described above, since each portion of an object can be extracted by a plurality of binarization circuits, an object can be easily extracted from a video signal without using a special background. Further, by having the binarization performed on a color difference plane normalized by the luminance signal, the extraction of object can be performed in stabilized conditions even if there are produced changes in illuminance.

Figure 18:
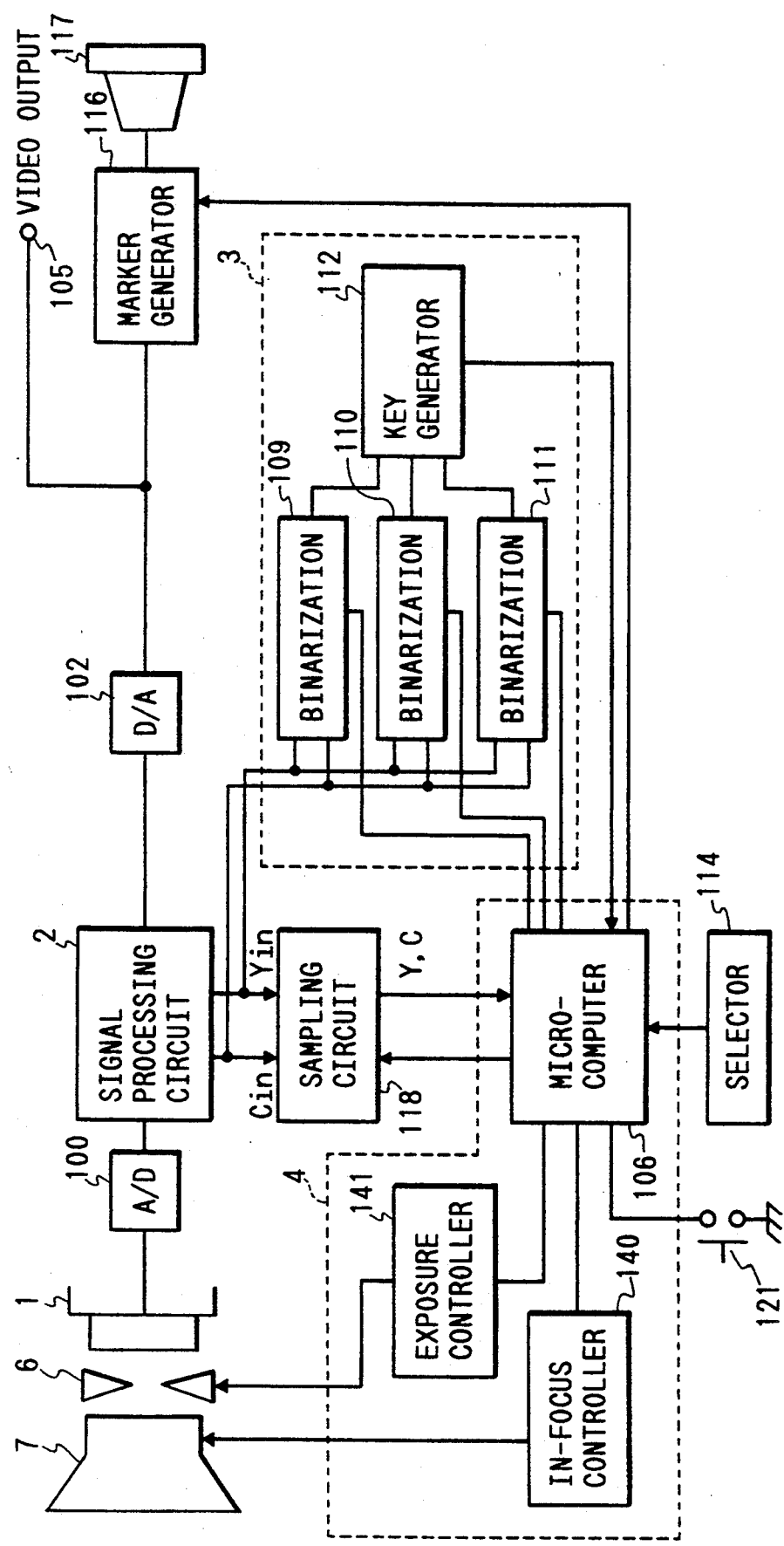
FIG. 18 is a block diagram showing an embodiment of a video camera with a marker having an apparatus for extracting an object according to the present invention incorporated therein.

FIG. 18 is a block diagram showing the main portion of a video camera according to a further embodiment of the invention. This embodiment is an example of application in which an improvement in both auto-exposure control and autofocus control are achieved. The extractor circuit 3 has the same structure as that in FIG. 9. Basic operations in the present embodiment are the same as that described above.

The selector 114 is used to select one of the controls of auto focus and auto exposure. The following explanation is an example in which auto focus function is selected. Here, a camera operator, while viewing the view finder 117, directs the camera to a target object so that the marker superposed on the image comes on a target object in the image displayed on the view finder 117. Then the operator pushes the switch 121, and thereby, the microcomputer 106 recognizes that the object on which the video camera has to be focused. Thereupon, the microcomputer 106 informs the sampling circuit 118 to start the sampling of Y and C signals around the area that corresponds to the place where marker is displayed. The Y and C signals sampled by the sampling circuit 118 are then sent back to the microcomputer 106 where extraction conditions used for the binarization circuits 109 to 111 are set. The number of Y and C signals sampled and the positions where those signals are sampled are determined by the microcomputer 106, which can be programmed in various ways. Once the extraction conditions of the binarization circuits 109 to 111 are set, the target is extracted and the key signal representing the target object is outputted to the microcomputer 106. Then the microcomputer 106, on the basis of the key signal, outputs the control signal to the in-focus controller 140 so that the designated object becomes in focus.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A video camera for automatically controlling an operation of the video camera and for generating a video signal utilizing imaging means, comprising:
    means for indicating an area of a specific portion of an object viewed by a camera operator;
    means for sampling the video signal in the region of the indicated area;
    means for setting at least one parameter of the specific portion of the object in accordance with the sampled video signal;
    means for extracting at least the specific portion of the object from the video signal in accordance the set parameter; and
    means for controlling the operation of the video camera in accordance with the extracted portion of the object of the video signal.

2. A video camera according to claim 1, wherein the indicating means includes a marker generator for displaying a marker in a view finder of the video camera, and the sampling means effects sampling of the video signal in the region of the indicated area in which the marker is located as displayed in the view finder.

3. A video camera according to claim 1, wherein the controlling means controls focusing of the video camera in accordance with the extracted portion of the object of the video signal.

4. A video camera according to claim 1, wherein the controlling means controls exposure for the video camera in accordance with the extracted portion of the object of the video signal.

5. A video camera according to claim 1, further comprising means for enabling electric zooming of at least the extracted specific portion of the object of the video signal.

6. A video camera according to claim 1, wherein the setting means includes a plurality of different parameter setting means for setting different parameters for distinguishing a plurality of areas of the video signal in accordance with the plurality of different set parameters, the extracting means including means for determining the object to be extracted in accordance with a combination of outputs of the plurality of different parameter setting means corresponding to the plurality of areas of the video signal.

7. A video camera according to claim 6, wherein the different parameter setting means includes a plurality of binarization means for generating respective binary signals indicating a plurality of different areas of the object of the video signal, and the extracting means includes means for generating a key signal in accordance with outputs of the binarization means in accordance with the set parameters for indicating the object to be extracted.

8. A video camera according to claim 6, wherein the extracting means includes a plurality of signal processing means for applying different signal processing to the video signal, and selecting means for selecting the processed signals as an output video signal in accordance with the object to be extracted.

9. A video camera according to claim 6, wherein the extracting means includes signal processing means for applying predetermined signal processing to the video signal, and the extracting means includes means for outputting the processed signal in accordance with one of the object to be extracted and other than the object to be extracted.

10. A video camera according to claim 9, wherein the extracting means applies no signal processing to the video signal for the object to be extracted.

11. A video camera according to claim 10, wherein the signal processing means provides an external video signal as the processed signal.

12. A video camera according to claim 6, wherein the plurality of means for setting different parameters set parameters representing a combination of ranges of chrominance and luminance for different areas of the video signal.

13. A video camera for automatically controlling an operation of the video camera and for generating a video signal utilizing imaging means, comprising:
means for setting a plurality of different parameters for distinguishing a plurality of areas in an input video signal provided by the imaging means according to the plurality of different set parameters;
means for determining an extracting area including at least one of the plurality of areas distinguished by the setting means;
extracting means for generating extracting information for the extracting area for the video signal; and
controlling means for controlling an operation of the video camera in accordance with the extracting information.

14. A video camera according to claim 13, wherein the controlling means controls a focusing operation of the video camera in accordance with the extracting information.

15. A video camera according to claim 13, wherein the controlling means controls an exposure operation for the video camera in accordance with the extracting information.

16. A video camera according to claim 13, further comprising means for enabling electric zooming of the extracting area in accordance with the extracting information.

17. A video camera according to claim 13, further comprising replacement means for replacing a portion of the video signal in accordance with a predetermined signal based on one of the extracting area and other than the extracting area in accordance with the extracting information.

18. A video camera according to claim 17, wherein the replacement means includes a plurality of signal processing means for applying predetermined signal processing to the video signal, and selector means for selecting an output signal from the processed video signal as the predetermined signal.

19. A video camera according to claim 13, wherein the means for setting a plurality of different parameters set different combinations of ranges of chrominance and luminance for different areas of the video signal.

20. A video camera according to claim 13, wherein the means for setting a plurality of different parameters include a plurality of binarization means for generating respective binary signals for indicating said plurality of different areas, and the extracting means generates extracting information in accordance with a plurality of outputs of the plurality of binarization means.

21. A video camera according to claim 13, further comprising means for indicating at least a portion of an extracting area by a video camera operator, means for sampling the input video signal in the region of the indicated area, and means for enabling extraction in accordance with the sampled signal.

22. A video camera according to claim 21, wherein the indicating means includes a marker generator for displaying a marker in a view finder of the video camera, and the sampling means samples the video signal in the region in which the marker is located as displayed on the view finder.

23. A video signal processing apparatus enabling extraction of an image of an object from an input video signal, comprising:
means for setting a plurality of different parameters for distinguishing a plurality of different areas in the input video signal according to the plurality of different set parameters;
means for determining an extracting area including at least one of the plurality of areas distinguished by the setting means; and
means for extracting an image of the object of the input video signal according to the determined extracting areas.

24. A video signal processing apparatus according to claim 23, wherein the setting means includes a plurality of binarization means for generating respective binary signals indicating a plurality of different areas of the object of the video signal, the determining means including means for generating a key signal in accordance with outputs of the binarization means in accordance with the set parameters for indicating the image of the object to be extracted.

25. A video signal apparatus according to claim 23, wherein the extracting means includes a plurality of signal processing means for applying different signal processing to the video signal, and selecting means for selecting the processed signals as an output video signal in accordance with the object to be extracted.

26. A video signal processing apparatus according to claim 23, wherein the extracting means includes signal processing means for applying predetermined signal processing to the video signal, and the extracting means includes means for outputting the processed signal in accordance with one of the object to be extracted and other than the object to be extracted.

27. A video signal processing apparatus according to claim 26, wherein the extracting means applies no signal processing to the video signal for the object to be extracted.

28. A video signal processing apparatus according to claim 27, wherein the signal processing means provides an external video signal as the processed signal.

29. A video signal processing apparatus according to claim 23, wherein the plurality of means for setting different parameters set parameters representing a combination of ranges of chrominance and luminance for different areas of the video signal.

30. A video signal processing apparatus according to claim 23, further comprising means for indicating an area of a specific portion of an object viewed by a camera operator, and means for sampling the input video signal in the region of the indicated area, the set parameters being set according to the sampled signal.

31. A video signal processing apparatus according to claim 23, wherein the video signal processing apparatus forms a part of a video camera having imaging means for generating the input video signal, the video signal processing apparatus providing an output video signal.

32. A video signal processing apparatus according to claim 23, wherein the video signal processing apparatus is part of a video tape recorder providing the input video signal, the video signal processing apparatus providing an output video signal from the input video signal reproduced from a magnetic tape.

* * * * *